United States Patent [19]

Bunes

[11] 4,196,294
[45] Apr. 1, 1980

[54] ORANGE ANTHRAPYRIDINE MONOMERIC COLORANTS AND COLORANT PRECURSORS

[75] Inventor: Leonard A. Bunes, San Carlos, Calif.

[73] Assignee: Dynapol, Palo Alto, Calif.

[21] Appl. No.: 900,835

[22] Filed: Apr. 28, 1978

Related U.S. Application Data

[62] Division of Ser. No. 751,856, Dec. 17, 1976, abandoned.

[51] Int. Cl.² .................. A23L 1/275; C09B 5/14
[52] U.S. Cl. ...................... 546/76; 260/377; 424/63; 426/540; 546/26; 546/27
[58] Field of Search .......... 260/278, 37 P, 46.5 E; 426/250; 546/76, 27, 26

[56] References Cited

U.S. PATENT DOCUMENTS

| | | | |
|---|---|---|---|
| 3,920,855 | 11/1975 | Dawson et al. | 260/144 X |
| 4,000,118 | 12/1976 | Dawson et al. | 260/144 X |
| 4,018,826 | 4/1977 | Gless et al. | 260/144 X |
| 4,096,134 | 6/1978 | Otteson et al. | 260/144 X |

FOREIGN PATENT DOCUMENTS

| | | | |
|---|---|---|---|
| 827961 | 5/1938 | France | 260/278 |
| 964602 | 7/1964 | United Kingdom | 260/278 |

*Primary Examiner*—Floyd D. Higel
*Attorney, Agent, or Firm*—William H. Benz

[57] ABSTRACT

Orange colors having the anthrapyridine structure

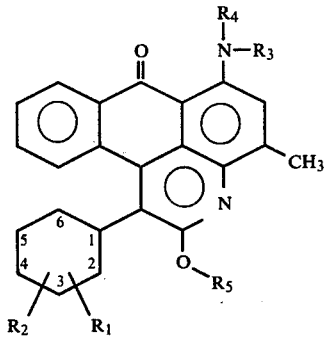

are disclosed wherein $R_1$ and $R_2$ are independently selected from among hydrogen, halos, lower alkyls, lower alkoxies, nitros, and sulfonates, $R_3$ and $R_4$ are independently selected from hydrogens, alkyls and alkylsulfonates of 1 through 3 carbon atoms and $R_5$ is a lower alkyl or lower alkyl sulfonate.

27 Claims, No Drawings

ORANGE ANTHRAPYRIDINE MONOMERIC COLORANTS AND COLORANT PRECURSORS

This is a division of application Ser. No. 751,856, filed Dec. 17, 1976, now abandoned.

BACKGROUND OF THE INVENTION

1. Field of the Invention

This invention relates to colorants. More particularly, it concerns a family of orange colorants which find special application as orange colorants for edibles.

2. The Prior Art

FD&C Yellow No. 6, a monoazo dye of the formula

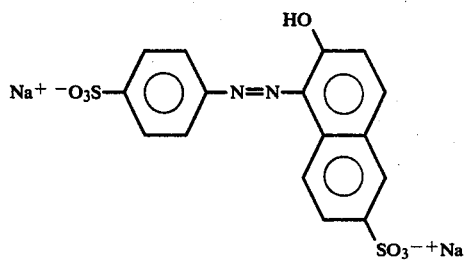

commonly known as "Sunset Yellow" is currently the most widely used artificial color in foods and other edibles. It has an excellent orange hue which renders it useful in the wide range of yellow to orange to red-orange colored foods such as orange drink, soda, gelatin desserts, jellies and jams, orange cakes and the like and in nonfoods such as printing inks and the like. The past decade has seen a sustained attack on the general class of monoazo food colors. A number of these materials, including most notably and recently Reds No. 2 and 4, have been banned from edibles or had their useage seriously restricted by governmental action. This attack has given rise to searches for suitable replacements for the presently used monoazo dyes. A number of natural dyes, such as the carotenoid yellows, have been proposed as orange food colors but are very expensive.

The present invention relates to new orange dyes which may be in monomeric or polymeric form. In polymeric form, they offer the advantage of being nonabsorbable from the gastrointestinal tract of mammals and thus present substantially reduced risks of toxicity.

SUMMARY OF THE INVENTION

The new and useful monomeric colorants of this invention are represented by the following structural formula

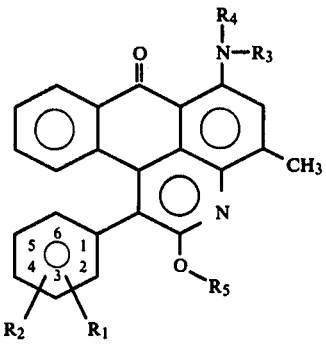

wherein $R_1$ and $R_2$ are independently selected from hydrogen, halo of atomic number 9 through 53, nitro, alkyl and alkoxy of 1 through 3 carbon atoms, and sulfonate;

$R_3$ and $R_4$ are independently selected from hydrogen, alkyl and alkyl sulfonate of 1 through 4 carbon atoms, and a noncrosslinked organic polymeric backbone which covalently links together a plurality of units of this color into polymeric form; and $R_5$ is selected from alkyl and alkyl sulfonate of 1 through 4 carbon atoms.

New and useful polymeric colorants of this invention are more fully represented by the following structural formula

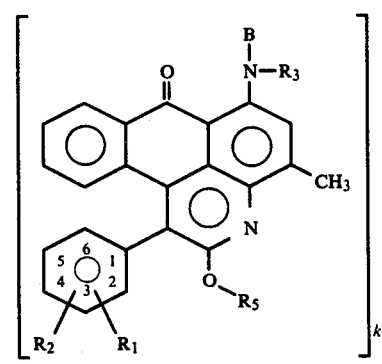

wherein $R_1$, $R_2$, $R_3$ and $R_5$ are as previously defined, B is a non-crosslinked organic polymeric backbone which covalently links together a plurality of units of this color into polymeric form, and k is a number greater than 1.

The monomeric and polymeric colorants of this invention are prepared from an intermediate represented by the formula

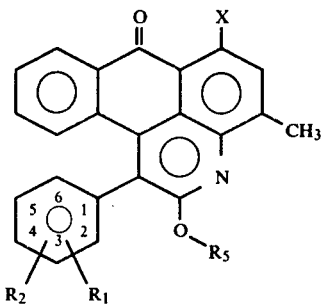

wherein
$R_1$, $R_2$, and $R_5$ are as previously defined and X is chloro, bromo or iodo.

DETAILED DESCRIPTION OF THE INVENTION

Compositions of the Invention

The colorants of this invention may be in monomeric or polymeric form. Both forms are derived from novel intermediate compounds which also are part of this invention.

Thus, a first aspect of this invention comprises a compound chosen from those represented by the formula

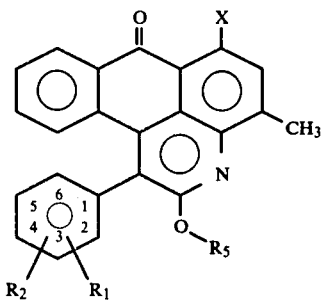

wherein
X is a halo of atomic number of 17 through 53, namely chloro, bromo or iodo, $R_1$ and $R_2$ independently are selected from the class of substituents consisting of hydrogen, halo having an atomic number of 9 through 53, namely, fluoro, chloro, bromo or iodo; nitro; lower alkoxy of 1 through 3 carbon atoms such as ethoxy, n-propoxy, isoproxy, or preferably methoxy; sulfonate; or lower alkyl of 1 through 3 carbons namely methyl, ethyl, or propyl; and $R_5$ is alkyl or alkyl sulfonate of 1 through 4 carbon atoms including, for example, methyl, ethyl, propyl, butyl methylsulfonate, ethylsulfonate, propylsulfonate and butylsulfonate. The alkylsulfonates are preferably in the form of their alkali metal (Na+, K+, etc.) salts.

The remaining three positions on the ring to which $R_1$ and $R_2$ are covalently bonded carry hydrogens. $R_1$ and $R_2$ preferably are separately attached to the ring at the 2, 4 or 6 positions. More preferably, $R_1$ is hydrogen and $R_2$ is at the 4 position and is selected from hydrogen, halo of atomic number 9-53 (especially chloro), alkoxy of 1-3 carbon atoms (especially methoxy), and alkyl of 1-4 carbons (especially methyl).

Most preferably $R_1$ and $R_2$ are both hydrogen.

The X substituent is preferably bromo while $R_5$ is preferably propyl sulfonate or the sodium or potassium salt thereof, e.g., $-(CH_2)_3SO_3^- {}^+Na$.

The compounds represented by formula (I) are intermediates for preparing the monomeric colorants of formula (II) or the polymeric colorants of formula (III).

Another aspect of this invention comprises a monomeric colorant chosen from those represented by the formula

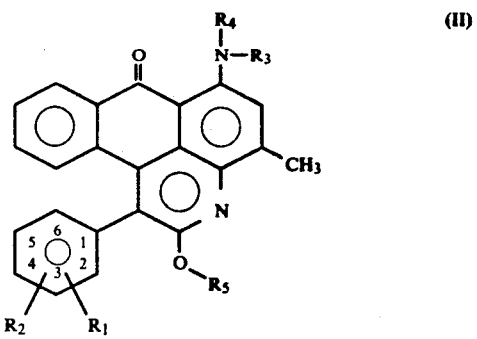

wherein
R's 1, 2 & 5 are defined as set forth above, along with the preferences;

$R_3$ is hydrogen, alkyl of 1 through 3 carbon atoms or alkyl sulfonate of 1 through 4 carbons (or the alkali metal salts), but preferably is hydrogen or methyl; and $R_4$ is hydrogen, alkyl of 1-4 carbon atoms or alkyl sulfonate of 1-4 carbon atoms (or the alkali metal salts).

The monomeric colorants represented by formula (II) are excellent orange dyes, especially wherein $R_3$ is hydrogen and $R_4$ is hydrogen or alkyl, preferably methyl. The compounds wherein $R_3$ and $R_4$ are both hydrogen are preferred.

Surprisingly, the presence of the diverse range of other $R_1$ and $R_2$ substituents, varying from strongly electron withdrawing nitro groups to strongly electron donating alkoxy groups makes only minor differences in the shade of these colors. A group of preferred colors having a single nonhydrogen substituent on the nonfused ring is shown in Table I.

Table I

| Substituent | Ring Position |
| --- | --- |
| Cl | 2 or 4 |
| Br | 2 or 4 |
| $SO_3^-M^{+*}$ | 4 |
| $NO_2$ | 2 or 4 |
| $-O-CH_3$ | 4 |
| $-O-C_2H_5$ | 4 |
| $-CH_3$ | 4 |

*M = Na or K or the like

TABLE II

| Backbone | Polymeric Color |
|---|---|
| polyvinylamine | $+CH-CH_2\!\!\rightarrow_{\!\!n}\!+\!CH-CH_2\!\!\rightarrow_{\!\!m}$<br>$\qquad\;\;\mid\qquad\qquad\quad\mid$<br>$\qquad\;\;NH\qquad\qquad NH_2$<br>$\qquad\;\;\mid$<br>$\qquad\;\;Chrom.*$<br>n = 10 to 4000, preferably 100 to 2000<br>m = 0.3 to 5n |
| polyvinylamine with acetylated residual amines | $+CH-CH_2\!\!\rightarrow_{\!\!n}\!+\!CH-CH_2\!\!\rightarrow_{\!\!m}$<br>$\qquad\;\;\mid\qquad\qquad\quad\mid$<br>$\qquad\;\;NH\qquad\qquad NHAc$<br>$\qquad\;\;\mid$<br>$\qquad\;\;Chrom.$ |
| copoly(vinylamine/ vinylsulfonate) (shown in sodium form) (other alkaline metals will work) (amine can be 1 to 3 carbon N-alkyl amine as well) | $+CH-CH_2\!\!\rightarrow_{\!\!n}\!+\!CH-CH_2\!\!\rightarrow_{\!\!p}\!+\!CH-CH_2\!\!\rightarrow_{\!\!m}$<br>$\qquad\;\;\mid\qquad\qquad\quad\mid\qquad\qquad\quad\mid$<br>$\qquad\;\;NH\qquad\qquad SO_3^{-\,+}Na\qquad NH_2$<br>$\qquad\;\;\mid$<br>$\qquad\;\;Chrom.$<br>n = 10 to 2000<br>m = 0.3 to 5n<br>p = 0.3 to 2 (n+m) |
| copoly(vinylamine/vinyl sulfonate) with acetylated residual amines. | $+CH-CH_2\!\!\rightarrow_{\!\!n}\!+\!CH-CH_2\!\!\rightarrow_{\!\!p}\!+\!CH-CH_2\!\!\rightarrow_{\!\!m}$<br>$\qquad\;\;\mid\qquad\qquad\quad\mid\qquad\qquad\quad\mid$<br>$\qquad\;\;NH\qquad\qquad SO_3^{-\,+}Na\qquad NHAc$<br>$\qquad\;\;\mid$<br>$\qquad\;\;Chrom.$ |
| poly N-methylvinylamine (other N-lower alkyl amines can be used as well) | $+CH-CH_2)_n(CH-CH_2\!\!\rightarrow_{\!\!m}$<br>$\qquad\;\;\mid\qquad\qquad\quad\mid$<br>$\qquad\;\;N-CH_3\qquad N-CH_3$<br>$\qquad\;\;\mid\qquad\qquad\quad\mid$<br>$\qquad\;\;Chrom.$ |
| copoly(vinylamine/ acrylic acid) (amines can be acetylated as well) | $+CH-CH_2\!\!\rightarrow_{\!\!n}\!+\!CH-CH_2\!\!\rightarrow_{\!\!m}\!+\!CH-CH_2\!\!\rightarrow_{\!\!p}$<br>$\qquad\;\;\mid\qquad\qquad\quad\mid\qquad\qquad\quad\mid$<br>$\qquad\;\;NH\qquad\qquad NH_2\qquad\qquad COOH$<br>$\qquad\;\;\mid$<br>$\qquad\;\;Chrom.$ |
| sulfonated polyvinylamine or N-methylvinylamine or the like. | $+CH-CH_2\!\!\rightarrow_{\!\!n}\!+\!CH-CH_2\!\!\rightarrow_{\!\!m}\!+\!CH-CH_2\!\!\rightarrow_{\!\!p}$<br>$\qquad\;\;\mid\qquad\qquad\quad\mid\qquad\qquad\quad\mid$<br>$\qquad\;\;NR\qquad\qquad NR\qquad\qquad\; NR$<br>$\qquad\;\;\mid\qquad\qquad\quad\mid\qquad\qquad\quad\mid$<br>$\qquad\;\;Chrom.\qquad\;\; H\qquad\qquad\;\; SO_3^-\,Na^+$<br>R = lower alkyl of 1 to 3 carbons or hydrogen (secondary alkyl and primary amines can be acetylated) |
| aminated poly(epichlorohydrin) (with added sulfamates) | $+CH-CH_2-O\!\!\rightarrow_{\!\!n}\!+\!CH-CH_2-O\!\!\rightarrow_{\!\!m}\!+\!CH-CH_2-O)_p$<br>$\qquad\;\;\mid\qquad\qquad\qquad\mid\qquad\qquad\qquad\mid$<br>$\qquad\;\;NH\qquad\qquad\quad NH_2\qquad\qquad\quad NH$<br>$\qquad\;\;\mid\qquad\qquad\qquad\qquad\qquad\qquad\quad\mid$<br>$\qquad\;\;Chrom.\qquad\qquad\qquad\qquad\qquad\quad SO_3^{-\,+}Na$ |
| aminated and acetylated poly(epichlorohydrin) | $+CH-CH_2-O\!\!\rightarrow_{\!\!n}\!+\!CH-CH_2-O)_m$<br>$\qquad\;\;\mid\qquad\qquad\qquad\mid$<br>$\qquad\;\;NH\qquad\qquad\quad NHAc$<br>$\qquad\;\;\mid$<br>$\qquad\;\;Chrom.$ |

*Chrom. equals 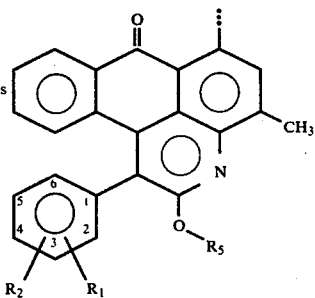

Among backbones, polyvinylamine and copoly(-vinylamine/vinylsulfonate), either acetylated or unacetylated, are preferred. These preferred backbones preferably have molecular weights of about 10,000 to about 200,000 Daltons and, in the case of the copolymer, an amine to sulfonate ratio of from 1:1 to 3:1. A polyvinylamine meeting this weight range has from about 200 to about 3000 units, a copolymer—from about 60 to about 1800 amine units. The choice among backbones often depends upon the degree of water solubility required of the final polymer colorant product. Polar groups such as carboxyls, phosphonates and especially sulfonates are required in the polymeric colorant to impart good water solubility properties. When the color unit itself contains sulfonates, i.e., when $R_1$, $R_2$ and/or $R_5$ are sulfonates or alkyl sulfonates, it is not necessary to have these polar groups attached to the backbone as well. When the color unit does not contain sulfonate $R_1$, $R_2$ or $R_5$, good water solubilities, i.e., solubility in pH 7 room temperature water of at least 1000 ppm, are achieved only when a backbone containing polar groups—such as the copolymer backbones—is employed.

Preparation of the Composition

The colorants of this invention may be prepared by the following exemplary methods, which are not to be construed as limiting the scope of this invention.

A. Preparation of the Novel Intermediates of This Invention

The novel intermeidates are prepared in a three-step process which comprises (1) reacting 1-amino-2-methyl-4-haloanthraquinone (A) with a suitable substituted or unsubstituted phenylacetyl chloride to form 1-phenylacetylamino-2-methyl-4-haloanthraquinone (B), (2) cyclyzing (B) with base to form the cyclized intermediate (C), and (3) forming the intermediate (D). The process may be represented by the following reaction scheme:

pressure to obtain higher temperatures if desired. Reaction time is inversely proportional to temperature. Reaction times of from a few (3-5) minutes to about 24 hours generally are employed. The following examples will aid in selecting times and temperatures. At 50°-80° C., times of about 10-24 hours are usually adequate. At 110°-115° C., the reaction appears complete in about 20-30 minutes with times of from 20 minutes to three hours being used; at 150° C., 3 to 5 minutes are adequate. Generally, a slight molar excess of the acid halide is employed since it is the less expensive reactant. AMBAX/acid halide ratios of 1:1 to 1:2.0 are generally preferred with ratio of 1:1.1 to 1:1.3 being most preferred.

(2) In the second step, this AMBAX addition product (B) is cyclized with base to form the product represented by Formula (C), above. The base employed is not critical, any strong inorganic base such as NaOH, KOH or the like will work. From 0.5 to 2 equivalents (basis colorant) of base may be used. This step is generally carried out at elevated temperatures such as 90° C. to 250° C. with temperatures of 90° to 200° C. being preferred. This step can immediately follow the acid halide addition step (1) by adding base to the crude

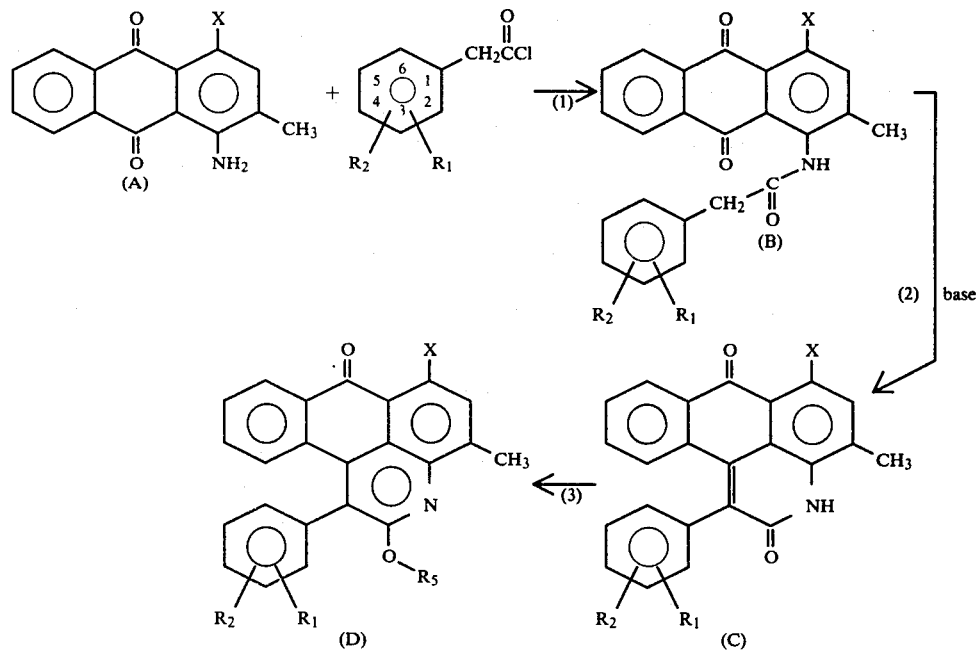

(1) In the first step 1-amino-2-methyl-4-haloanthraquinone (preferably the 4-bromoanthraquinone a material marketed by Sandoz Color and Chemical under the tradename AMBAX) is reacted with the appropriately $R_1$ and $R_2$-substituted benzyl acid halide. This reaction is carried out in liquid phase in a reaction solvent. Suitable solvents include aprotic organic liquids especially cyclic and acyclic olefinically saturated aromatic or aliphatic hydrocarbons such as benzene, toluene, xylene, hexane, cyclohexane, heptane, $C_6$-$C_9$ hydrocarbon mixed solvents, cyclic and acyclic ethers such as dimethoxyethane, 1,4-dioxane, diglyme, and the like. This reaction is carried out at elevated temperatures such as from 50° C. to 150° C. with temperatures of from 75° C. to 130° C. being preferred. In our work the atmospheric reflux temperature of the solvent has been used. The reaction could be carried out under halide addition product and heating for from about five minutes to about 24 hr. At 80° C., 24 hr is a good reaction time, at 110°-120° C., 15 minutes to one hour are employed. At 175°-200° C., five minutes are employed. Otherwise, the halide addition product can be isolated by evaporation of solvent and crystallization and dissolved in fresh inert aprotic solvent such as those used for the addition or protic solvents and then treated with base. This more complicated method offers some yield advantages. Both methods yield the intermediate (C). In the case where both $R_1$ and $R_2$ are both hydrogen, this intermediate may be further reacted at this stage to introduce or change the $R_1$ and $R_2$ substituents. Particularly, sulfonate $R_1$'s or $R_2$'s may be introduced at this stage by liquid phase contact with 100% $H_2SO_4$ at 80°-150° C. for 0.5 to 2 hours or by treatment with 15–30% oleum at room temperature (18° C.) to 50° C. for 0.5 to 5 hr.

(3) In the third step of this process, the $R_5$ component is attached while simultaneously aromatizing the fused pyridone ring, that is, converting it to a pyridine structure. This step is an "O-alkylation" reaction and proceeds mechanistically as follows:

First the pyridone oxygen is converted to an enolate anion (alkoxide) by the action of base

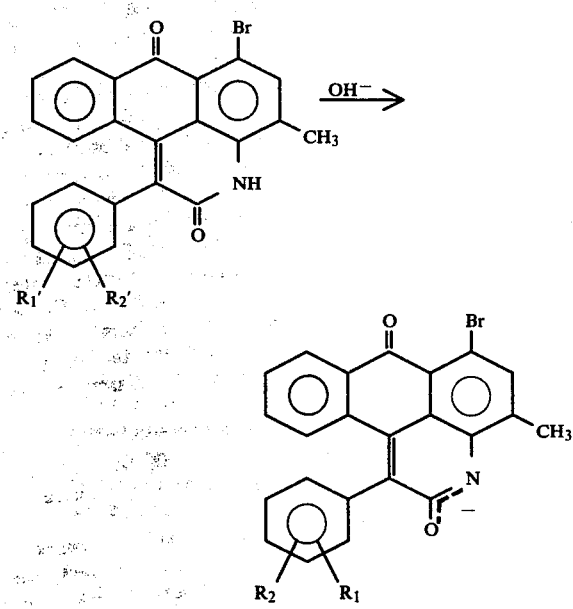

This step is carried out in liquid phase in a solvent for the anthrapyridone chromophore. If $R_1$ is sulfonate, water may be used. In other cases, a less polar inert liquid is required to dissolve the anthrapyridone, with DMF, sulfolane, HMPA and N-methylpyrrolidone being examples of the class of useful solvents. This generation of alkoxide ions requires that a base be present. While any base capable of achieving a pH of 10 or greater may be used, as may any amount of base from the stochiometeric requirement to large excesses, there are good reasons to control the kind and amount of base employed. It is generally best to use from about 1.0 to about 1.3 moles of base per mole of alkoxide ion desired with amounts from 1.01 to about 1.2 moles of base per mole of alkoxide ion being preferred.

The most preferred bases are the alkali metal carbonates, expecially $K_2CO_3$ and $Na_2CO_3$. NaOH, KOH, $Ca(OH)_2$ and the like inorganic hydroxides will work as well but are less preferred. When these inorganic hydroxides are used the reaction pH is usually 12 or greater. Such pH's or large excesses of base, such as above 1.3 mole per mole of alkoxide desired are wonderful for forming alkoxide but have the disadvantage of wastefully consuming alkylating agent. Obviously, this is not critical to chemical success of this reaction. If one is prepared to accept alkylating agent loses, one can use these stronger bases and/or large excesses of base. The formation of alkoxide ion takes place slowly at room temperature (24 hours being required for full reaction) and may be carried out in 30 minutes at 80°–90° C., or in 1–3 minutes at 150° C. In our work, we have found 65°–100° C. and 20–60 minutes to give excellent results.

Once the alkoxide ion is formed, an alkylating agent is added. This addition can take place simultaneously with the generation of alkoxide ions subject to the limitation that the base will gradually consume unreacted alkylating agent. Thus, it is often preferable to add the alkylating agent after the alkoxide ion formation is essentially complete. The reaction between alkoxide and alkylating agent is fast, relative to the alkoxide ion formation, requiring but a minute or two to complete at 65°–100° C. Any agent which can add the desired $R_5$ alkyl or alkylsulfonate may be employed. When $R_5$ is to be lower alkyl the corresponding bromo or iodo alkanes, such as methylbromide, ethylbromide, n-propylbromide, butylbromide and the iodide equivalents may be used as may dialkylsulfates such as dimethylsulfate, diethylsulfate, dipropylsulfate and dibutylsulfate. When $R_5$ is to be a lower alkylsulfonate the sultones such as propane sultone and 1,4-butane sultone and the halosulfonates such as 2-chloro, bromo or iodoethylsulfonate, 3-chloro, bromo or iodo propylsulfonate or 4-chloro, bromo or iodobutylsulfonate may be used. This list is far from exhaustive. The art is repleat with other equivalent agents which could be substituted for these materials if desired.

The amount of alkylating agent is generally controlled. Many of these materials, for example propane sultone, are reactive and potentially dangerous. Use of large excesses of these materials can give rise to contamination and side reactions. Accordingly it is generally desirable to use from about 0.9 to about 1.2 moles of alkylating agent for each mole of alkylation theoretically desired. This is not critical and is not a limitation. One could use larger amounts if one were prepared to effect the required purifications and accept the loss of excess alkylation agent. Preferred ratios are from about 0.95 to 1.00 mole of alklating agent per mole of alkylation desired.

B. Preparation of the Monomeric or Polymeric Colorants of This Invention

The intermediate is next coupled to an amine. This

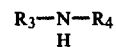

amine may be a monomeric amine as has been defined or it may be an amine group-containing polymer backbone as has been described. In this step the amine displaces the halo leaving group as follows.

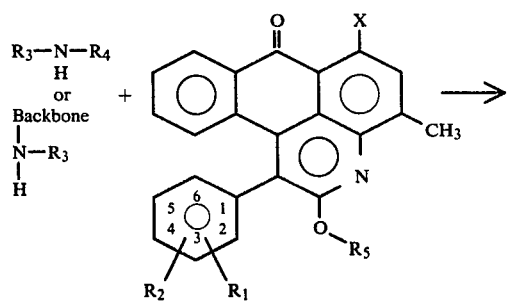

-continued

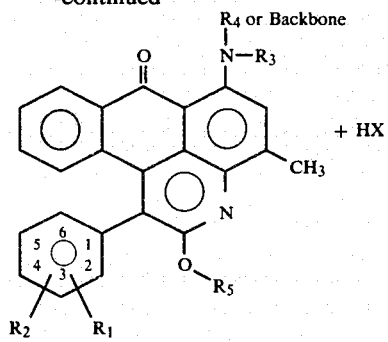

+ HX

This step is carried out in liquid phase as well, generally in a water or mixed water/organic solvent and base and with a copper catalyst. This amine displacement is an adaption of the classic Ullmann reaction.

Water, and water containing up to about 25% of a water-miscible organic, such as an alkanol or glycol (methanol, ethanol, ethylene glycol and the like), mono and dialkyl ethers of ethylene glycols such as the materials marketed by Union Carbide under the trademark Cellosolve ®, and liquid organic bases such as pyridine. Water and water containing up to about 20% pyridine are preferred solvents. The copper catalyst useful for this coupling may be copper metal, a copper (preferably cuprous) salt or an oxide of copper, for example finely divided copper metal, $Cu_2Cl_2$ and $Cu_2O$ supported on carbon black. A catalytically effective amount of catalyst is employed. Such an amount can range from about 0.01 to about 0.5 equivalents (preferably 0.05 to 0.4 equivalents) of copper per equivalent of coupling desired. Base, especially a strong inorganic base such as NaOH or KOH, should be present in an amount in excess of the molar amount of chromophore being coupled. Preferably from 0.5 to 5 equivalents (basis free amine) of base is present with amounts from 1 to 3 (especially about 2) equivalents giving best results. The coupling is effected at a temperature of from about 60° C. to about 200° C., preferably 80° C. to about 150° C., and a time of from about 0.2 hr to about 24 hours, preferably 0.5 hr to about 8 hours. This yields the coupled product

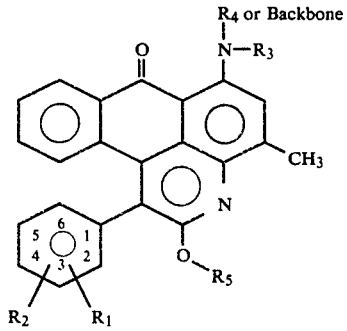

as a crude reaction mixture. The desired product can be freed of catalyst and impurities as desired. It may also be subjected to post treatments such as acetylation or the like as desired. See, for example, Example VII of U.S. Ser. No. 743,205 of Wingard, et al., filed on Nov. 18, 1976.

There is a process variation which may be used in this preparation if desired. This alternate route is the subject of concurrently filed U.S. patent application Ser. No. 751,855 of Bunes, et al, and now abandoned. In this alternative process, the attachment of $R_5$ and the aromatization of the pyridone ring take place after the coupling of the halo intermediate to the amine or amine-containing polymer. This route permits increased process flexibility but suffers the disadvantage of not yielding as pure-hued colors.

The monomeric and polymeric colorants of this invention product excellent orange colorants. Those containing polar groups in their chromophores, i.e., sulfonate $R_1$'s or $R_2$'s or alkyl sulfonate $R_5$'s or attached to their amines (i.e., when $R_4$ or the backbone contains a polar group) are water soluble. As solutions they present clear, bright intense oranges. When added in coloring amounts such as from 10 to 10,000 ppm weight, they bond to and dye fibers and other substrates.

As polymeric dyes they present especially advantageous utilities as colorants for edibles. The polymer compounds wherein $R_1$ and $R_2$ are hydrogen, $R_3$ is hydrogen or methyl and $R_5$ is propylsulfonate are especially useful in this application as these materials are virtually a direct match in hue for FD&C Color Yellow No. 6. The other polymeric members of this colorant family are good oranges for foods, blending well with yellows and reds to give the range of oranges desired by the food industry.

For food use the colorants may be polymeric and of molecular weight above about 1000 Daltons, preferably above about 2000 Daltons so as to preclude their absorption through the walls of the GI tract.

In edible applications the polymeric colors are dissolved in beverages and syrups, dry mixed into powdered drink mix and cake mix, and otherwise conventionally admixed with foods, beverages, pharmaceuticals and cosmetics. The amount of color used in these applications will range between about 10 ppm weight and about 1000 ppm weight, basis finished food, beverage or pharmaceutical. Cosmetic uses may require higher use levels.

EXAMPLE I

Preparation of

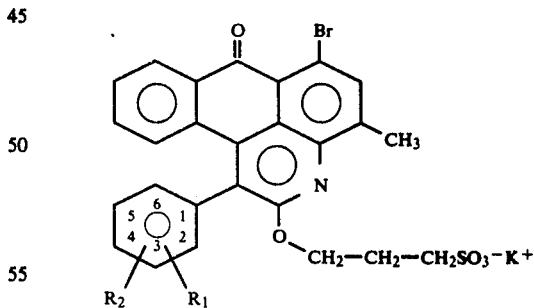

wherein $R_1$ and $R_2$ are hydrogen.

A. 1-Amino-2-methylanthraquinone (300 g) is slurried with 1500 ml of HOAc in a 5-liter flask. The temperature is raised to 40° C. Neat bromine (405 g) is added over 2½ hours with stirring at 40°–50° C. The mixture is stirred for 20 additional minutes and filtered. The solids so recovered are washed with HOAc and water and sucked dry with an aspirator and transferred to a reaction flask along with 150 g of $NaHSO_3$ and 1.5 liters of water. The mixture is gradually heated to 90° C. (over two hours) with stirring to give 1-amino-2-methyl-4-bromoanthraquinone (A) (also marketed as AMBAX) as a solid which is recovered from the reaction mixture by filtration in 90% yield, rinsed with water and dried overnight at 155° C. and 1 mm Hg absolute vacuum.

It will be appreciated that chlorine or iodine could be substituted for bromine in this reaction if desired.

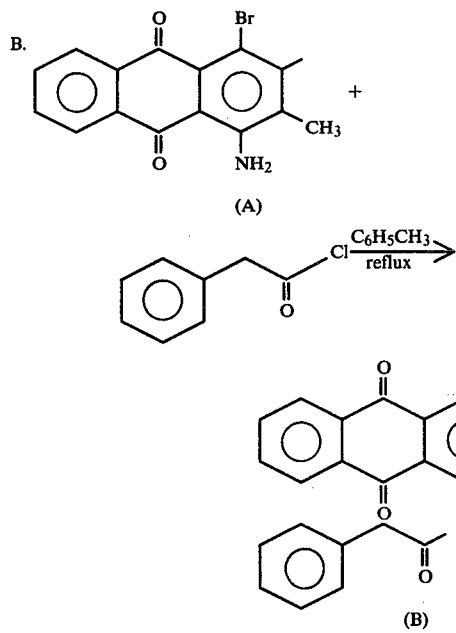

A 250 ml flask equipped with overhead stirrer, water-cooled condenser, and Ar inlet is charged with 15.8 g of the bromoanthraquinone (A) of part A and 120 ml of toluene. To the red slurry is added 8.5 g of the phenylacetyl chloride and the mixture is heated to reflux. After 3.5 hours refluxing, the reaction is cooled to ca. 80° and filtered. The dark yellow filtrate is concentrated to ca. 30 ml on a rotor evaporator and cooled. A large amount of dark solid forms which is isolated and washed with ether until a yellow (dark) solid is obtained. The solid is oven dried at 70°, <1 mm, for four hours to afford 12.5 g (57.6%) of yellow-green solid product, namely 1-N-phenylacetylamino-2-methyl-4-bromoanthraquinone (B).

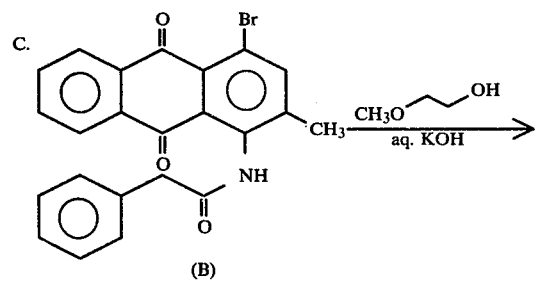

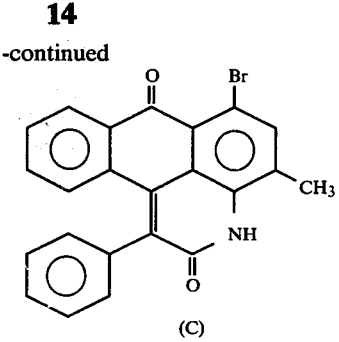

A 100 ml 3-necked flask is equipped with water-cooled condenser, overhead stirrer, thermowell, and Argon inlet. The flask is charged with 4.56 g phenylacetyl product (B) from Part B, and 30 ml methyl cellosolve. The contents are heated to 122° and 0.45 g KOH in 0.6 ml H₂O is added dropwise over one minute. The reaction mixture is stirred at 120° for one hour.

The reaction mixture is cooled to about 5° C. Isolation of a solid precipitate, followed by washing, affords 1.71 g (39.1%) of bright, shining gold solid (C).

The dark, yellow filtrate is concentrated via rotary evaporator to dryness and the dark solid is recrystallized from 170 ml of acetic acid to afford 2.3 g (52.6%) of a dull, golden colored powder (C). Total yield is 4.01 g (91.8%).

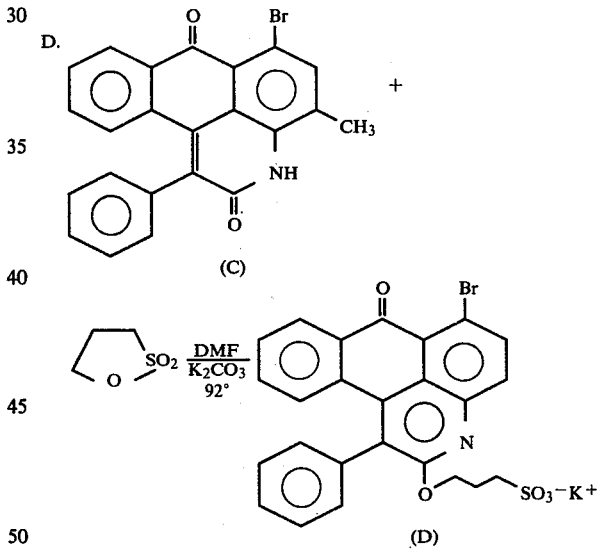

A 100 ml 3-necked flask equipped with Argon inlet, air condenser, thermowell and magnetic stirrer is charged with the compound from Part C, 50 ml dimethylformamide (DMF) and 0.78 g potassium carbonate (K₂CO₃). The system is deaerated thrice with argon. The yellow slurry turns slowly orange after the K₂CO₃ is added and becomes blood red when heated to 92°. The dark red solution is stirred at 92° C. for ½ hour. Then 0.655 g of propane sultone is added and rinsed in with 2 ml DMF. The reaction mixture is stirred and heated for 1.5 hours at 90°–92° C. and followed by thin layer chromatography (silica gel/5% acetone-CHCl₃). There is no apparent change from 1 hr to 1.5 hr and probably no change after 0.5 hr.

The reaction mixture is cooled to 38° C. and poured into 500 ml of magnetically stirred ethyl ether which is cooled in ice water. The resultant brown solid is isolated by suction on medium frit sintered glass and sucked dry, then allowed to air dry a few minutes.

The brown solid thus obtained is dissolved in 500 ml of hot water then filtered. (0.22μ millipore filter) while still hot to afford 600 ml of clear, reddish-brown liquid. Upon cooling, a solid precipitates. The slurry is reheated until clear, divided into 2 portions and freeze-dried. The lyophilized solid is dried further overnight at 80° and less than 1 tor in a vacuum oven to afford 2.98 g of fluffy yellow solid (96.4%).

EXAMPLE II

By following in principle the procedure of Example I, other compounds of this invention represented by Formula (I) may be prepared wherein $R_5$ is alkyl of 1 through 4 carbons by substituting other reactants for propane sultone. For example, dimethylsulfate, diethylsulfate, dipropylsulfate. and dibutylsulfate yield the corresponding compounds of Formula (I) wherein $R_5$ is methyl, ethyl, propyl, propyl, and butyl. Similarly, by substituting bromomethylsulfonate, 2-chloroethylsulfonate and 1,4-butane sultone for propane sultone other corresponding alkyl sulfonates are prepared, namely the methyl sulfonate, ethyl sulfonate, and n-butyl sulfonate, respectively.

It will be apparent to one of skill in the art that sodium carbonate may be used in place of the potassium carbonate in step D to give the corresponding sodium alkyl sulfonate.

EXAMPLE III

Monomeric colorants are formed from the halo intermediate prepared in Examples I and II as follows: In a typical preparation the intermediate of Example I (2.4 mmole) is charged to a 25 ml flask along with 2.2 mmole of sulfopropylamine, 7.2 ml of 1 N aqueous NaOH, 3-4 ml of water, 1-1.5 ml of pyridine and about 40 mg of $Cu_2Cl_2$.

The flask is equipped with a magnetic stirrer, thermowell, and reflux condenser. After flushing the system with argon and de-aerating, the contents are heated to reflux (95°-100°) for about 3 hours. The reaction mixture is then cooled to room temperature, diluted with dilute sodium hydroxide solution, and filtered to remove solids. The solution is then concentrated to dryness under reduced pressure, and the resultant solid dissolved back into water. The pure, monomeric dye can be isolated by preparative thin layer chromatography, preparative high pressure liquid chromatography, or by recrystallization. It has the structure

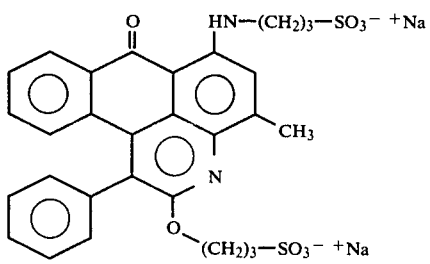

It will be appreciated that the materials of Example II could be substituted for the material of Example I.

EXAMPLE IV

The preparation of Example III is repeated using a variety of other monomeric amines thereby producing a range of monomeric colorants. The same reaction is employed with copper being used to catalyze the reaction of the monomeric amine with the haloanthrapyridine. The following materials are serially substituted for the sulfopropylamine used in Example III.

Ammonia*
Methylamine*
Ethylamine*
Diethylamine*
Propylamine*
tert-Butylamine*
Ethylpropylamine*
4-Sulfobutylamine
Di(Sulfopropyl)amine
Ethylsulfopropylamine

*It will be appreciated that with ammonia and these other volatile amine compounds, it is necessary to apply superatmospheric pressures to effect the reaction in liquid phase and that it is necessary to employ an appropriate pressure vessel as reaction zone.

The corresponding monomeric colorants are formed and recovered in accord with the principles of Example III.

EXAMPLE V

Formation of a homopolymeric polyaminoethylene (PAE) backbone (also known as poly(vinylamine) for coupling colors into polymeric form.

A stock solution of vinylacetamide is prepared as follows.

To 2304 g of acetamide (technical) in a 12-liter reaction flask is added 62.2 ml of 6 M aqueous sulfuric acid followed immediately by 661 g of acetaldehyde (99+%). This mixture is stirred and heated until the internal temperature reaches 78° C. (11 minutes) at which point the clear solution spontaneously crystallizes, causing a temperature rise to 95° C. The reaction product, ethylidene-bis-acetamide, is not separated. Heating and stirring are continued for another five minutes to a temperature of 107° C. and a mixture of 150 g calcium carbonate (precipitated chalk) and 150 g of Celite ® diatomaceous earth powder is added. A first distillate fraction of water and acetamide is removed. The remaining materials are cracked at 35 mm Hg and 185° C. A fraction made up of vinylacetamide and acetamide is taken overhead, analyzed by nuclear magnetic resonance and found to contain vinylacetamide and acetamide. This preparation is repeated 4 times and the products are pooled. A portion of this pooled material is dissolved in methanol, cooled, and filtered to yield a stock solution.

A stock solution containing 460 g of vinylacetamide, 557 g acetamide, and 123 g ethylidene-bis-acetamide, in 570 ml methanol is filtered through 250 g of Amberlite ® IRC-50 ion exchange resin over an eight hour period. The column is rinsed with 1000 ml methanol. The combined column eluant is stripped to its original volume of 1,667 ml, treated with 7.75 g of AIBN polymerization catalyst (1 mole %), deoxygenated, and stirred under Argon at 65° C. for 15 hours to polymerize. Solid polymer is precipitated from the resulting very thick solution by addition to 15 liters of acetone. The polymer is collected by filtration, washed with acetone and dried in a vacuum oven (80° C.) for two days to afford 459 g of crude poly(vinylacetamide) contaminated with acetamide as a yellow, semigranular solid having molecular weight of $2 \times 10^4$ as determined by gel permeation chromatography, using dimethylformamide as eluant and polystyrene as standards.

The crude poly(vinylacetamide) (459 g) is dissolved in 1000 ml water with heating. Concentrated hydrochloric acid (1000 ml) is added and the resulting dark brown solution is stirred and heated at a gentle reflux (97°–106° C.) for 19 hours. A precipitate forms and is redissolved by addition of 200 ml water. Reflux is continued and over the next eight hours 1000 ml water is added in several portions to maintain solubility of the polymer. After a total of 27 hours at reflux, the polymer is precipitated by the addition of 1000 ml concentrated hydrochloric acid. The mixture is cooled to 18° C. and the thick polymeric gum isolated by decantation and dried under vacuum at 50°–75° C. with occasional pulverization for 40 hours to give 332 g of poly(vinylamine hydrochloride) as a brown granular solid (77% yield from vinylacetamide, 59% from acetaldehyde).

EXAMPLE VI

Formation of a polymeric orange dye of this invention according to the following reaction scheme:

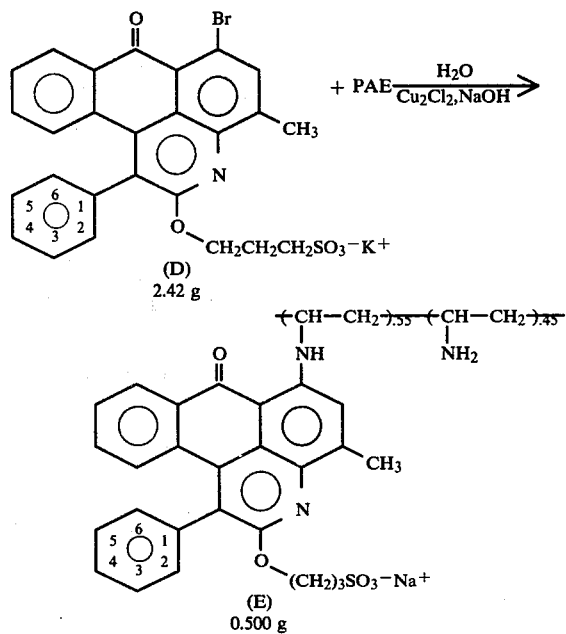

A 100 ml 3-necked flask is equipped with a water cooled condenser, argon inlet, overhead stirrer and thermowell. To the flask is added 0.500 g of the PAE polymer prepared according to Example V, 15.75 ml 1 N aqueous NaOH, and 4.25 ml H$_2$O. When the polymer has dissolved, the system is de-aerated (thrice with argon) and 0.055 g Cu$_2$Cl$_2$ and 2.42 g compound (D) are added. The resulting yellow-orange paste is heated to 95° where it quickly becomes a deep red solution. The mixture is stirred at 95° for 2 hours and then cooled and diluted with 50 ml pH 11 water. The resulting mixture is filtered through 0.8μ and 0.22μ millipore filters. Ultrafiltration with 5% pyridine in water at pH 11 is followed by lyophilization to afford 1.06 g of deep orange solid, represented by Formula (E) in the above reaction scheme.

EXAMPLE VII

Preparation of an acetylated version of the colorant of Example VI.

The polymeric colorant of Example VI (0.050 g) is dissolved in 25 ml of water and cooled to 5° C. Fifty percent NaOH is added to adjust the mixture to pH 12 followed by 0.5 g of acetic anhydride. The pH adjustment to 12 and acetic anhydride addition are repeated twice more, the pH finally being 9, to give a cloudy mixture. The reaction mixture is diluted with deionized water, filtered and ultrafiltered with deionized water to give a clear, deep orange solution. This solution is lyophilized to afford 490 mg of orange solid which is 19 mer% unacetylated amine groups (—NH$_2$) and 21 mer% acetylated amine groups

EXAMPLE VIII

Preparation of

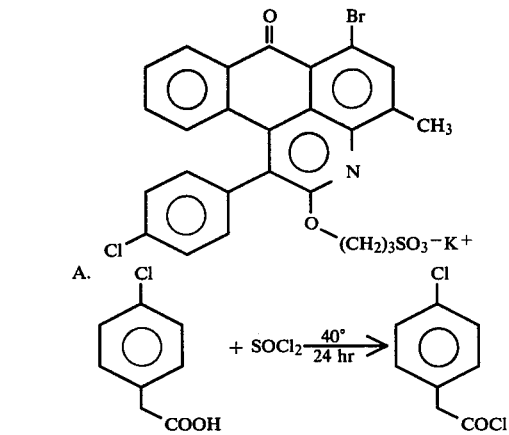

A 50 ml flask is charged with 17.06 g p-chlorophenylacetic acid and 11.90 g thionyl chloride. A single boiling chip is added and the flask fitted with air condenser and drying tube. The reaction mixture is heated in a 45° oil bath for 24 hr then cooled to ambient temperature. Five ml of benzene is added to the solution and light materials are pumped off at room temperature and 0.5 mm Hg. The product is then distilled through a short-path vacuum distillation apparatus at 0.10 mm Hg to give p-chlorophenylacetyl chloride as a water-white product; boiling point, 63°–64°.

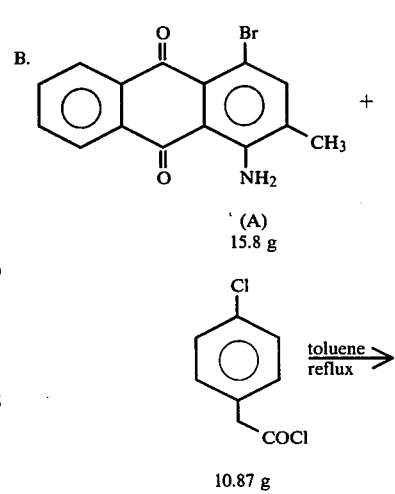

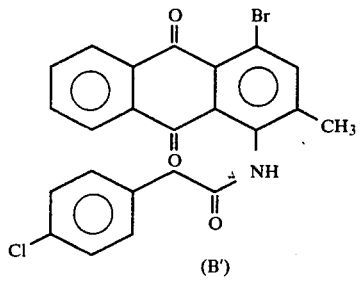

(B')

The procedure of Example I, Part B, is repeated (except the mixture is refluxed for only 1.5 hr) using the above materials to afford the above product (B'), namely 1-(N-p-chlorophenylacetylamino)-2-methyl-4-bromo-anthraquinone.

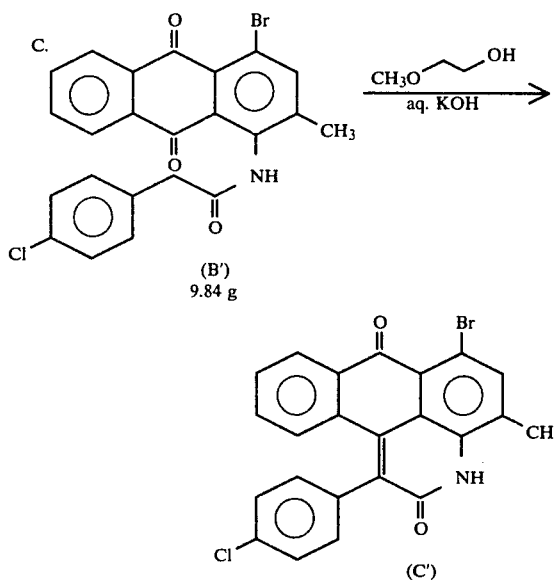

The product (B'-9.84 g) of Part B of this Example and 60 ml of cellosolve are added to a 250 ml flask as in Part C of Example I. The slurry is heated to 123°. Potassium hydroxide (0.88 g) is dissolved in 1.0 ml H₂O and added over one minute. The reaction is heated at 115° for 35 minutes then is allowed to cool slowly to room temperature and then cooled to 5° C. A solid precipitate is isolated and washed to afford 3.32 g of glittering, brownish/golden crystals.

The dark filtrate is concentrated to dryness and the resultant dark solid recrystallized from 675 ml boiling HOAc. The greenish-yellow needles are isolated and washed. Drying at 85°, <1 mm for four hours affords 3.8 g of a golden solid. This procedure gives a total yield of 7.12 g of a compound represented by Formula (C') above.

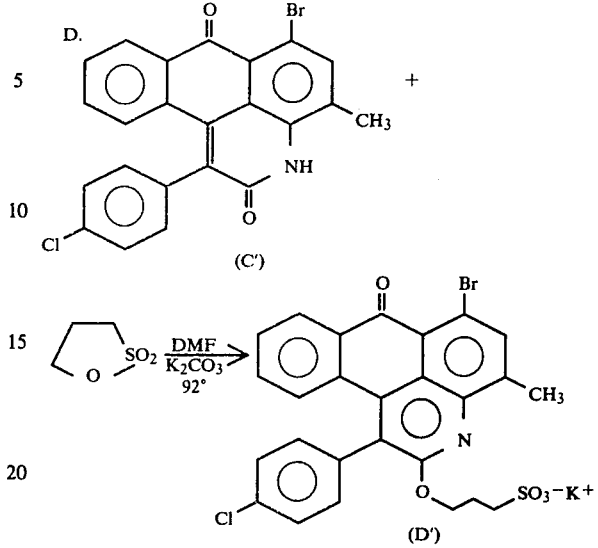

A 100 ml 3-necked flask fitted with an argon inlet, air cooled condenser, thermowell, and magnetic stirrer is charged with 45 ml DMF, 2.524 g of anthrapyridone derivative (C') and 0.797 $K_2CO_3$. The system is de-aerated by flushing thrice with argon and heated to 92° whereupon the yellow-orange slurry becomes a deep cherry red. The red suspension is stirred and heated 0.5 hr at 92°. The propane sultone (0.664 g) is added and rinsed in with 5 ml DMF to give a deep yellow-brown solution. The reaction mixture is heated at 92° for 1.5 hr then cooled to 40° C. The reaction mixture is precipitated into 500 ml of magnetically stirred ethyl ether and cooled in an ice bath. The resultant yellow-green precipitate is isolated on sintered glass and the solid dissolved in 1800 ml water at 95°. The resulting solution is filtered, the filtrate concentrated to 1 liter and lyophilized. The resultant dull, pale yellow solid is dried overnight at 80° C., <1 mm to afford 2.99 g (87.4%) of dull yellow solid represented by Formula (D').

EXAMPLE IX

By following in principle the procedure of Example VIII but employing other appropriately substituted phenylacetic acids for p-chlorophenylacetic acid, other corresponding compounds of this invention represented by Formula 1 wherein $R_5$ is a propyl sulfonate or its sodium or potassium salt may be prepared. Suitable starting phenylacetic acids may be represented by the following formula

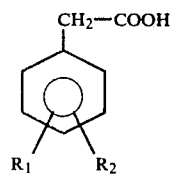

wherein $R_1$ and $R_2$ are independently hydrogen, fluoro, chloro, bromo, iodo, methoxy, ethoxy, n-propoxy, isopropoxy, nitro, sulfonate (or an alkali metal salt, methyl, ethyl, propyl, isopropyl, isobutyl, nitro and the like. Particularly useful in this regard are the 2- or 4-substituted phenylacetic acids such as 2- and 4-chlorophenylacetic acid, 4-bromophenylacetic acid, 4-iodophenylacetic acid, 4-methoxyphenylacetic acid, 4-sulfophenylacetic acid, 2 and 4-nitrophenylacetic acid.

The above phenylacetic acids may be reacted with compound (A) in Example I or a compound which is the same as compound (A) except the Br may be a Cl or I. In the latter case, the corresponding chloro or iodo compound would result.

EXAMPLE X

Preparation of polymeric dye.

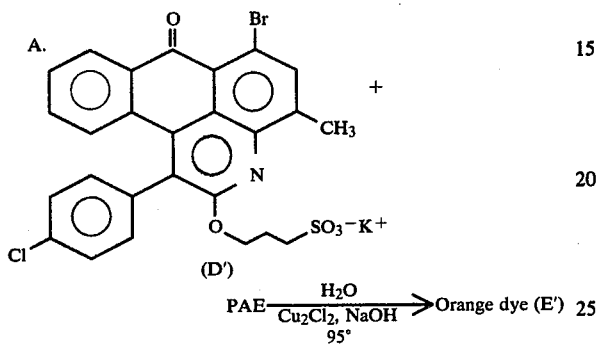

A polymer (PAE) is prepared according to the procedure set forth in Example V.

The polymer (0.500 g) and 15.75 ml 1 N NaOH together with 4.25 ml water are stirred until homogeneous in a 50 ml 3-necked flask fitted with an argon inlet, water-cooled condenser, thermowell and magnetic stirrer. The system is then de-aerated by flushing thrice with argon. Then 0.052 g Cu₂Cl₂ and 2.566 g anthrapyridine (D') are added. The resulting yellow paste is heated to 95° and gradually becomes red-orange and less viscous. Three ml additional water is added to reduce the viscosity. The mixture is stirred and heated at 96°–97° for 2.5 hr.

The murky reddish-orange reaction mixture is cooled and diluted with 40 ml pH 11 water. The finely divided suspension is then filtered and washed with DMF and water. The residue is soluble in wet DMF. The resultant filtrate is then passed through 0.8µ and 0.22µ millipore filters to afford 600 ml of deep, dark orange solution of ca. 5–10% DMF. The solution is ultrafiltered with 5% pyridine/water at pH 11 followed by deionized water. One-third of the product is lyophilized at this point to afford 570 mg of dark orange solid (E').

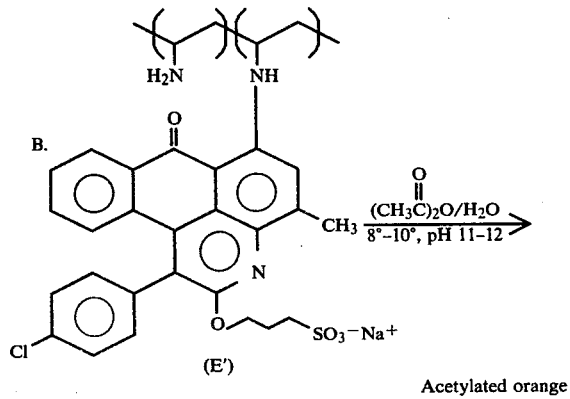

Acetylated orange

—continued dye (F')

Two thirds of the ultrafiltered orange dye from Part A of this example is acetylated according to the procedure set forth in Example VII using 0.35 ml (CH₃CO)₂O portions. The pH is adjusted to 10.5 after the third (CH₃CO)₂O addition and the orange solution is ultrafiltered with deionized water and lyophilized to afford 1.01 g of deep orange solid (F').

EXAMPLE XI

Formation of

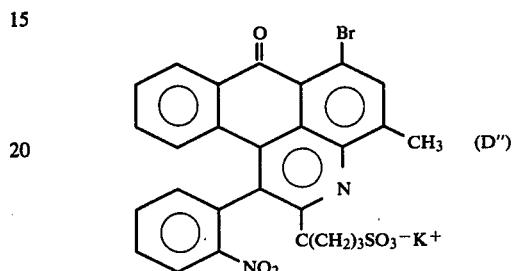

and two polymeric colorants derived therefrom.

A.

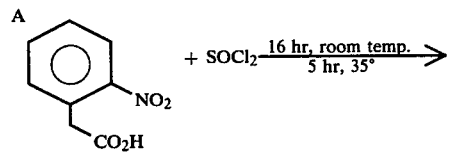

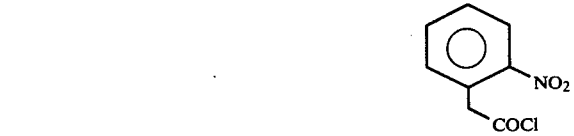

Thionylchloride (12.0 g) and 18.11 g of 2-nitrophenylacetic acid are weighed into a flask and allowed to stand at room temperature (∼21°) for 16 hours. A stirring bar is added and the reaction driven to completion by warming at 35° for five additional hours until no solid is visible. To the red solution is added 5 ml benzene and the volatile material is removed with vacuum to give 2-nitrophenyacetyl chloride.

B. The 2-nitrophenylacetyl chloride of Part A is reacted with AMBAX and the ring is closed according to the procedure of Parts B and C of Example I to give the product

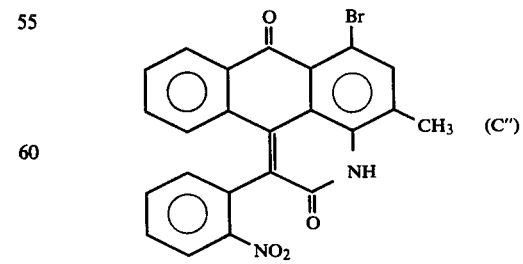

The reaction of this acid chloride with AMBAX is more facile and requires about three hours at reflux. The resulting product (C") is thereafter reacted with propanesultone according to the procedure set forth in Part D of Example XIII to give a compound of this invention represented by the formula (D'').

C. The compound of this invention (D'') made in Part B of this example is attached to the polymer of Example V using the method of Example VI.

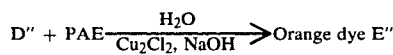

The polymer (0.350 g) is dissolved in 11 ml 1 N NaOH and 3 ml of H₂O is added. The solution is deaerated by flushing thrice with argon and the chromophore (D'') and 0.036 g of Cu₂Cl₂ are added. The reaction mixture is heated to 95° and stirred at this temperature for 3 hr.

The reaction mixture is cooled, diluted with basic H₂O, and filtered through glass filter-A, 0.8μ and 0.22μ millipore filters to afford 90 ml of dark orange liquid. This solution is ultrafiltered using 10% pyridine-pH 12 water for 2 days followed by deionized water.

The dye is not overly soluble in neutral H₂O, but one-third of the ultrafiltered suspension is lyophilized directly to afford 40 mg of orange-brown solid.

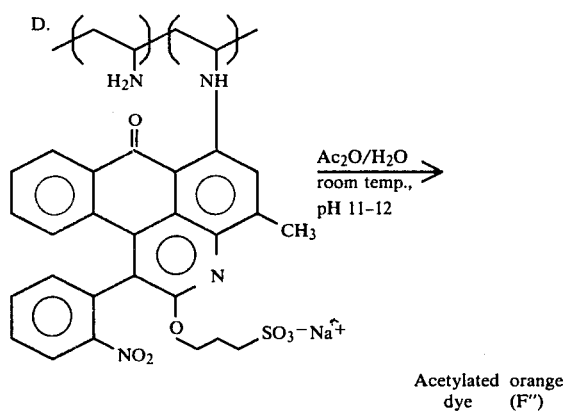

Acetylated orange dye (F'')

Two-thirds of dye E'' from Part C of this example is acetylated at room temperature using three 0.2 ml portions of (CH₃CO)₂O. The brownish-orange dye is then ultrafilterd with deionized water. The dye is further treated with three 0.2 ml portions of (CH₃CO₂)₂O as above and ultrafiltered again. The retentate is lyophilized to afford the desired acetylated polymeric orange dye.

EXAMPLE XII

Formation of

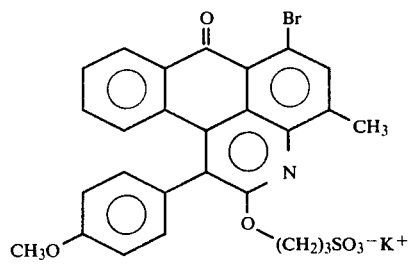

and two corresponding polymeric colorants.

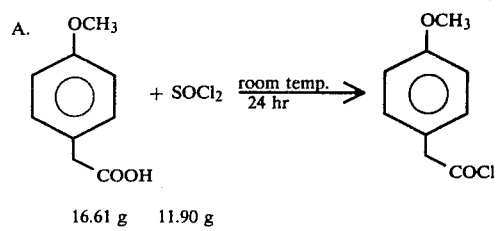

A flask is charged with 16.61 g 4-methoxyphenylacetic acid and 11.90 g thionyl chloride and allowed to stand at room temperature with occasional swirling for 24 hr. The endothermic reaction begins immediately and proceeds at a very good rate, generating an orange solution.

After 24 hr, nearly all gas evolution has ceased. Six ml benzene is added and the volatile material is removed with vacuum. The product, 4-methoxyphenylacetyl chloride, is purified by distillation, b.p., 71°–72° C. at 0.1 mm Hg, to afford 14.47 g (79%) of a colorless liquid.

B. A flask is charged with 15.8 AMBAX and 115 ml toluene. Then 10.1 g of acetyl chloride from Part A of this example, is added. The red slurry is heated to reflux for 2.0 hours. The hot mixture is filtered and a black residue washed with three portions of hot toluene. The toluene is stripped off affording a solid which is washed with ether. The product is dried overnight at 70° C., 1 mm to afford 19.48 g of dull green powder, represented by the formula

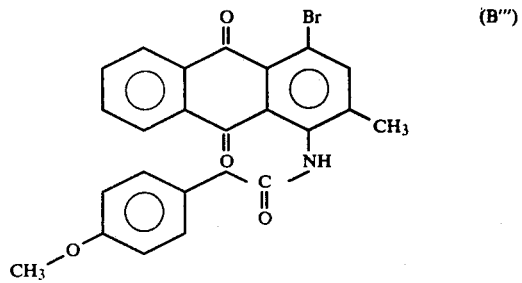

The product represented by the formula (B''') is then treated with base according to the procedure of Claim I, Part C, to give a compound represented by the formula

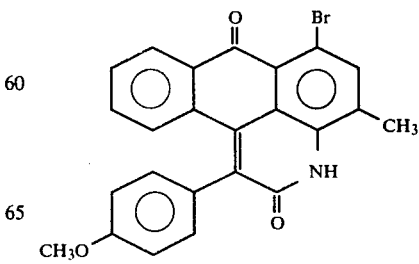

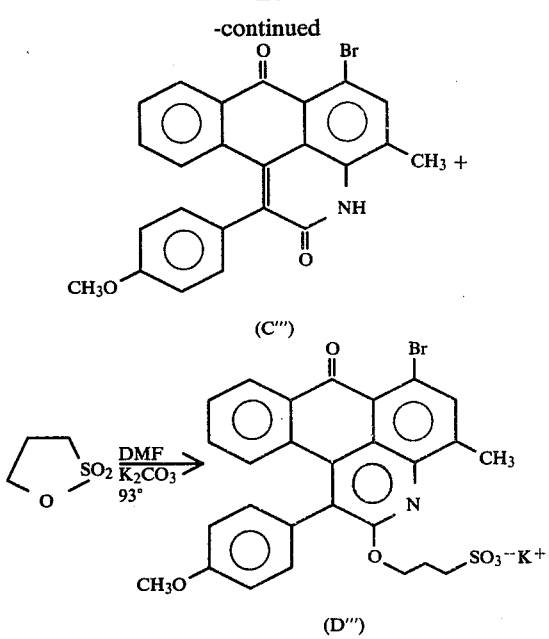

C. A 100 ml 3-necked flask equipped with magnetic stirrer, air-cooled condenser, argon inlet and thermowell is charged with 2.499 g of the anthrapyridone (C'''), 0.797 g of K₂CO₃, and 40 ml of DMF. The system was deaerated thrice with argon and heated to 93° for 0.5 hr. The mixture becomes a deep cherry red but upon addition of 0.664 g of the propane sultone, the color changes to yellow-orange. The reaction mixture is heated at 93° for 1.5 hr then cooled to 40°.

The cooled reaction mixture is slowly poured into 500 ml of magnetically stirred, ice-bath cooled ethyl ether. The resultant orange precipitate is isolated on sintered glass, washed with ethyl ether and then dissolved in 1.4 liter of water at 95°. The fine suspension is filtered through glass filter-A to afford a clear, orange solution.

The orange solution is then concentrated to ~700 ml and lyophilized to afford 2.513 g of an orange solid.

D.

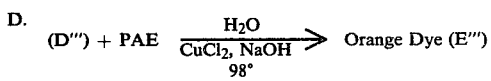

A 50-ml 3-necked flask equipped with reflux condenser, argon inlet, magnetic stirrer, and thermowell is charged with 0.400 g of PAE, 12.6 ml 1 N NaOH, and 3.4 ml H₂O. The system was de-aerated by flushing thrice with argon and 2.037 g of chromophore (D''') and 0.042 g Cu₂Cl₂ are added. The orange slurry is heated to 98° at which point it becomes a dark orange solution. The reaction is stirred and heated for 3 hr then cooled and diluted with 30 ml of dilute base. The orange mixture is filtered through glass filter-A, 0.8μ, and 0.22μ millipore filter to afford a dark orange solution which is then ultrafiltered continuously, with 10% pyridine-water at pH 12 for 24 hr. After ultrafiltration with deionized water, one-third of the dye is lyophilized to afford 215 mg of orange solid. The remaining two-thirds is acetylated by cooling in an ice bath and treating with 4 successive portions of (CH₃CO)₂O (0.2 ml), each time adjusting the pH to ca. 11.5 before the next addition. The pH is adjusted to ~10 after the 4th (CH₃CO)₂O addition and the dye is ultrafiltered with deionized water then lyophilized to afford 485 mg of bright-orange solid.

EXAMPLE XIII

A. Preparation of PAE/SES copolymer backbone.

Following the general principles of Example V a stock solution 4.1 molar in vinylacetamide in isopropanol is prepared.

Into a five-liter flask is added 505 ml (272 g) of a vinylacetamide solution obtained by stripping isopropanol from 900 ml of the above stock solution (containing 3.69 moles of vinylacetamide). Azo-bisisobutyronitrile (15 g) in 1500 ml of water is added followed by 1279 g of 25 weight-% sodium vinyl sulfonate in water (Research Organic Corporation) and one liter of water. This is two equivalents of sulfonate per three equivalents of vinylacetamide. Following deoxygenation, the mixture is heated to 65° C. and there maintained with stirring for three hours. This reaction mixture is then reduced to ⅔ volume, filtered and the liquid added to eight gallons of isopropanol. The copolymer precipitate is collected and dried in vacuum to yield 865 g of solid copolymer (molecular weight 6.6×10⁴). Whenever an experimental molecular weight is given in this specification, it is derived by gel permeation techniques. In the primary technique, a silanized porous glass support is used with a 0.01 M LiBr in DMF eluant. Detection is by refractometer with standardization being based on suitable purchased poly(styrene) or poly(styrene sulfonate) standards.

Into a two-liter flask is added 863 g of the just-noted solid product, 2.5 liters of water and a liter of concentrated hydrochloric acid. The mixture is refluxed (99°–110° C.) for about 24 hours and cooled, the solid precipitate is washed, and dissolved in three liters of 10% NaOH. This mixture is added to about 12 liters of methanol to give 400 g of fine solid precipitate which is a copolymer of aminoethylene and sodium ethylenesulfonate (PAE/SES).

B. Preparation of a polymeric colorant of this invention having a PAE/SES backbone.

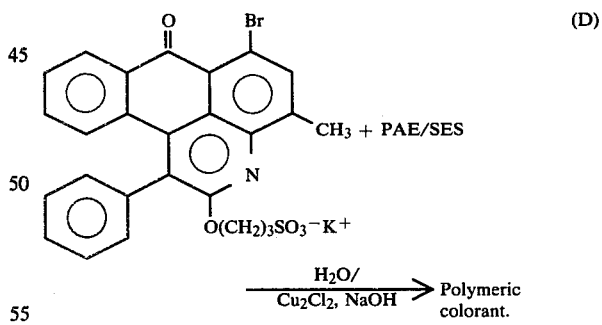

A 50-ml two-necked flask is charged with 0.500 g of the copolymer as prepared according to Part A of this example, 11.5 ml 1 N NaOH, and 5 ml H₂O. The system is deaerated. The copolymer dissolves and 1.325 g of the anthrapyridine (D) prepared according to Example I and 0.077 g Cu₂Cl₂ are added and the mixture is heated to 97°. After 2½ hours, the mixture is cooled and diluted with 40 ml water at pH 11.

The diluted mixture is filtered to afford 100 ml of an orange solution. The solution is ultrafiltered using 10% pyridine in water at pH 11 and later pH 7 water as makeup.

The solution is lyophilized to afford 0.850 g of solid which is determined to be

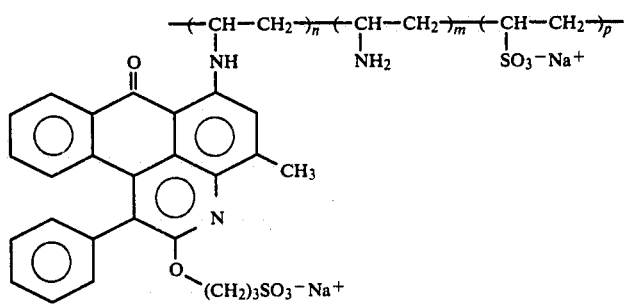

wherein
m+n+p = ~900
n = ~440
m = ~220
p = ~350

C. Preparation of acetylated PAE/SES colorant of this invention.

By following in principle the procedure set forth in Example VII, the free amine groups along the polymeric backbone are acetylated. Conversion of amine groups is 50–90%.

EXAMPLE XIV

Preparation of a polymeric colorant of this invention having a poly(N-methylvinylamine) backbone.

A. Preparation of Poly(N-Methylvinylamine) Backbone.

The preparation of poly(N-methylvinylamine) is begun by adding 500 g of N-methylaminoethanol to 1380 g (2.20 equivalents) of acetic anhydride at 115°–120° C. The reaction is exothermic (cooling required) and is complete by the time the addition is concluded. The bis-acetylated product,

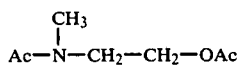

is isolated by vacuum distillation (b.p., 95°–98°/0.1 mm) as a colorless oil in about 93% yield.

The bis-acetylated product is pyrolyzed by passing 642 g of this material at a rate of 1.17 g/minute through a Pyrex$^R$ helices-packed quartz tube (3.5 cm diameter, 40 cm length) maintained at 480°. A 400 ml/minute argon stream is employed. The crude pyrolysate is a dark orange oil weighing 1350 g. The crude mixture containing the desired N-methylvinylacetamide is distilled (72° C./20 mm) to afford 250 g of purified N-methylvinylacetamide.

Polymerization of 225 g of purified N-methylvinylacetamide is carried out in 500 ml of methanol at 70° C. in the presence of 4 mol% of azo-bisisobutyronitrile. The polymerization is complete within 12 hr and affords 200 g yield of poly(N-methyl vinyl-acetamide).

The polymeric amide is hydrolyzed with 6 N HCl at 125° to yield poly(N-methylvinylamine) as the hydrochloride. This material has a molecular weight of about 20,000 as determined by gel permeation chromatography comparisons to standards. The hydrolysis is monitored by nuclear magnetic resonance and requires roughly 40 hours to go to completion. The product is isolated in essentially quantitative yield by precipitation of the partially evaporated reaction mixture from isopropanol.

B. Preparation of the Polymeric Colorant.

The compound (D) prepared according to the procedure of Example I is reacted with the poly(N-methylvinylamine) of Part A of this Example according to the procedure set forth in Example VI to give a polymeric colorant of this invention represented by the formula

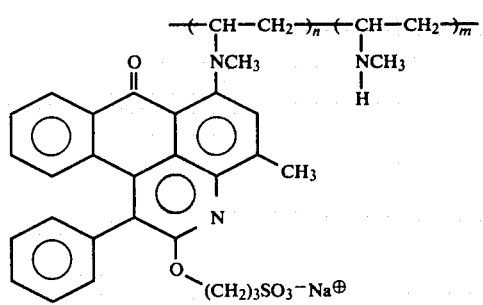

wherein
n is ~100 and
m is ~250

C. Preparation of the Acetylated Polymer Colorant.

By following in principle the procedure set forth in Example VII but employing the polymeric colorant in Part B of this example, an acetylated version of the polymeric colorant of Part B is obtained. The product has about 75–85% of its residual amines in an acetylated form.

D. By reacting other monomeric colorants of this invention such as those in Examples VIII, IX, XI, XII, and the like with the polymer of Part A, other polymeric colorants of this invention are prepared.

What is claimed is:

1. A compound of the formula

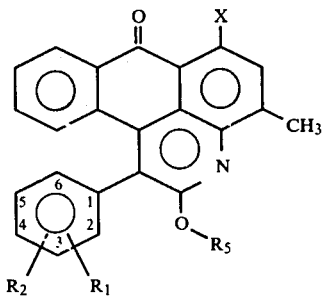

wherein $R_1$ and $R_2$ are independently selected from the group consisting of hydrogen, fluoro, chloro, bromo, iodo, lower alkoxy of 1 through 3 carbon atoms, nitro, sulfonate and alkyl of 1 through 3 carbon atoms, $R_5$ is alkyl of 1 through 4 carbon atoms or alkyl sulfonate of 1 through 4 carbon atoms; and X is chloro, bromo or iodo.

2. The compound of claim 1 wherein $R_5$ is said alkyl sulfonate.

3. The compound of claim 2 wherein $R_5$ is propyl sulfonate.

4. The compound of claim 1 wherein $R_1$ is hydrogen.

5. The compound of claim 4 wherein $R_2$ is hydrogen.

6. The compound of claim 5 wherein X is bromo and $R_5$ is propyl sulfonate.

7. The compound of claim 4 wherein $R_2$ is fluoro, chloro, bromo or iodo and $R_2$ is in the 4 position.

8. The compound of claim 7 wherein $R_2$ is chloro, X is bromo, and $R_5$ is propyl sulfonate.

9. The compound of claim 4 wherein $R_2$ is a lower alkoxy of 1 through 3 carbon atoms and is in the 4 position.

10. The compound of claim 9 wherein $R_2$ is methoxy, X is bromo, and $R_5$ is propyl sulfonate.

11. The compound of claim 4 wherein $R_2$ is sulfonate and is in the 4 position.

12. The compound of claim 11 wherein $R_5$ is propyl sulfonate.

13. A monomeric colorant of the formula wherein $R_1$ and $R_2$ are independently selected from the group consisting of hydrogen, fluoro, chloro, bromo or iodo, inclusive nitro, lower alkoxy of 1 through 3 carbon atoms, sulfonate and lower alkyl of 1 through 3 carbon atoms; $R_3$ and $R_4$ independently are selected from the group consisting of hydrogen, lower alkyl of 1 through 3 carbon atoms and lower alkyl sulfonate of 1 through 3 carbon atoms; and $R_5$ is alkyl of 1 through 4 carbon atoms or alkyl sulfonate of 1 through 4 carbon atoms.

14. The compound of claim 13 wherein $R_5$ is said alkyl sulfonate.

15. The compound of claim 14 wherein $R_5$ is propyl sulfonate.

16. The compound of claim 14 wherein $R_3$ is hydrogen or methyl and $R_4$ is hydrogen, alkyl of 1 through 4 carbon atoms or alkyl sulfonate of 1 through 4 carbon atoms.

17. The compound of claim 16 wherein $R_3$ and $R_4$ are both hydrogen.

18. The compound of claim 17 wherein $R_1$, $R_2$, $R_3$ and $R_4$ are all hydrogen.

19. The compound of claim 18 wherein $R_5$ is propyl sulfonate.

20. The compound of claim 13 wherein $R_1$ is hydrogen.

21. The compound of claim 20 wherein $R_2$ is hydrogen.

22. The compound of claim 20 wherein $R_2$ is fluoro, chloro, bromo or iodo and $R_2$ is in the 4 position.

23. The compound of claim 22 wherein $R_2$ is chloro and $R_5$ is propyl sulfonate.

24. The compound of claim 20 wherein $R_2$ is a lower alkoxy of from 1 to 3 carbon atoms and $R_2$ is in the 4 position.

25. The compound of claim 24 wherein $R_2$ is methoxy, $R_3$ and $R_4$ are both hydrogen, and $R_5$ is propyl sulfonate.

26. The compound of claim 20 wherein $R_2$ is sulfonate and is in the 4 position.

27. The compound of claim 26 wherein $R_2$ is sulfonate, $R_3$ and $R_4$ are both hydrogen and $R_5$ is propyl sulfonate.

* * * * *